United States Patent [19]

Kokubo et al.

[11] Patent Number: 5,686,993
[45] Date of Patent: Nov. 11, 1997

[54] METHOD OF AND APPARATUS FOR MEASURING FILM THICKNESS

[75] Inventors: Masahiko Kokubo; Masahiro Horie, both of Kyoto, Japan

[73] Assignee: Dainippon Screen Mfg. Co., Ltd., Japan

[21] Appl. No.: 677,274

[22] Filed: Jul. 9, 1996

[30] Foreign Application Priority Data

Jul. 18, 1995 [JP] Japan .................................. 7-181813

[51] Int. Cl.⁶ .................................................. G01B 11/06
[52] U.S. Cl. ........................................ 356/381; 250/559.27
[58] Field of Search ................................. 356/381, 382; 250/559.27

[56] References Cited

U.S. PATENT DOCUMENTS 5,486,701   1/1996   Norton et al. ........................... 356/381

*Primary Examiner*—F. L. Evans
*Attorney, Agent, or Firm*—Ostrolenk, Faber, Gerb & Soffen, LLP

[57] ABSTRACT

A film thickness measuring apparatus measures the thickness of a thin film which is formed on a substrate with an excellent reproducibility regardless of inclination of a surface of a sample. Since an illumination system (20) includes a glass rod (GL) which corrects wavelength dependencies of luminance distributions of light sources (HL, DL), even when an eclipse in reflected light due to inclination of a sample (SP) decreases the energy of the reflected light, a spectral distribution of the reflected light entering a spectroscopic unit (40) is maintained with almost no change. A control unit (50) performs data conversion of multiplying an actual spectral reflectance by a ratio of an average of the actual spectral reflectance which is determined based on an output from the spectroscopic unit (40) to an average of a calibrated spectral reflectance and thereafter calculates a deviation between the two spectral reflectances. As a result, the film thickness is accurately measured while preventing an influence of inclination of the sample (SP).

10 Claims, 8 Drawing Sheets

METHOD OF AND APPARATUS FOR MEASURING FILM THICKNESS

BACKGROUND OF THE INVENTION

1. Field of the Invention

The present invention relates to a method of and an apparatus for measuring the thickness of a thin film which is formed on a substrate based on a spectral characteristic of reflected light in a non-contact and non-destructive manner.

2. Description of the Related Art

Figure 9:
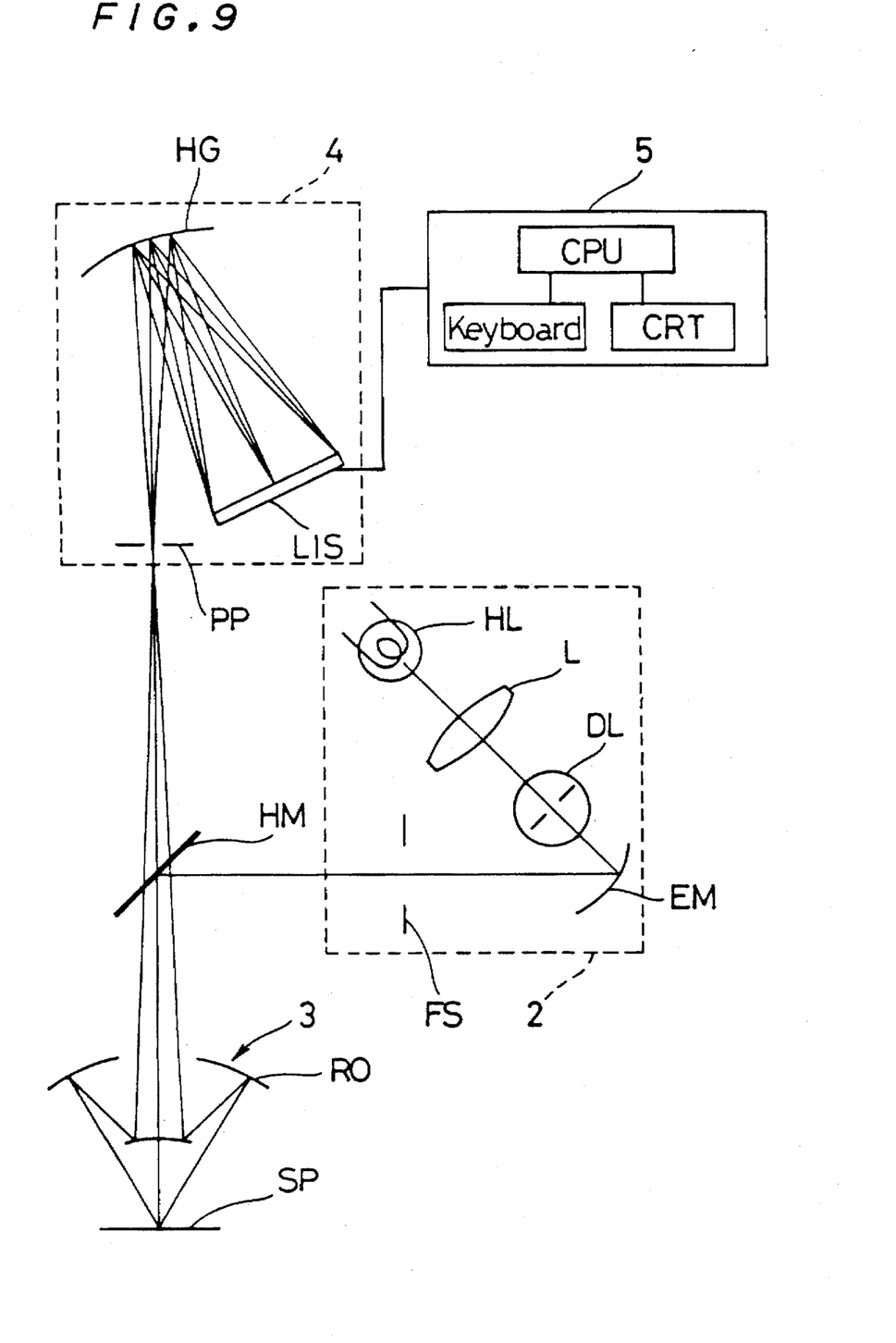
FIG. 9 is a diagram for describing a structure of a conventional film thickness measuring apparatus.

FIG. 9 shows a conventional film thickness measuring apparatus. An illumination system 2 of the film thickness measuring apparatus includes a halogen lamp HL and a see-through type deuterium lamp DL as a light source. A bundle of light emitted from halogen lamp HL which serves as a light source is converged at a light emitting part of the deuterium lamp DL through a lens L, and is then allowed through a field stop FS through an off-axis ellipse mirror EM.

An imaging system 3 includes a reflection objective lens RO and a half mirror HM. After leaving the field stop FS, illuminated light which is reflected by the half mirror HM is directed upon a surface of a sample SP to be measured which is placed at an imaging side focal plane of the reflection objective lens RO, to irradiate the sample SP. A bundle of light reflected by the surface of the sample SP passes through the half mirror HM to be converged at a plate PP which is disposed in a spectroscopic unit 4.

The spectroscopic unit 4 includes the plate PP having a pin hole, a concave diffraction grating HG for separating reflected light from the plate PP, and a photo detector LIS for detecting spectrum from the concave diffraction grating HG. Reflected light from the sample SP which is taken through the plate PP is separated by the concave diffraction grating HG, and is detected by the photo detector LIS as a spectral signal which corresponds to the energy of each spectrum.

A control unit 5 calculates an actual spectral reflectance of the sample, based on the spectral signal which is taken on the sample SP. The control unit 5 then calculates a deviation from a calibrated spectral reflectance which is theoretically calculated in advance for every appropriate film thickness pitch, finds a film thickness value which has the smallest deviation, and displays the result on a CRT screen.

Using light of a wide wavelength range from the ultraviolet range to the near infrared red range, the apparatus described as above measures the thickness of a film on the sample SP in a non-contact and non-destructive manner. Particularly when the sample SP is comprised of an Si substrate and an overlying extremely thin $SiO_2$ film not exceeding 100 angstroms in thickness, for instance, although the spectral reflectance shows no big change in the visible range, the spectral reflectance largely changes near 200 nm. Hence, if the apparatus described as above uses light in the vicinity of 200 nm and calculates the spectral reflectance, the apparatus can measure the thickness of the extremely thin film.

However, when the surface of the sample SP is inclined due to thermal processing, etc., the conventional film thickness measuring apparatus cannot ensure a reproducibility of film thickness measurement on an extremely thin film and the like. To deal with this disadvantage, a method has been proposed which requires to perform film thickness measurement while performing fine inclination correction by means of a inclination correction mechanism which is disposed to a stage which supports the sample SP. Still, this methods takes time to control the stage and degrades the throughput of measurement, Which is a new problem.

Figure 7A:
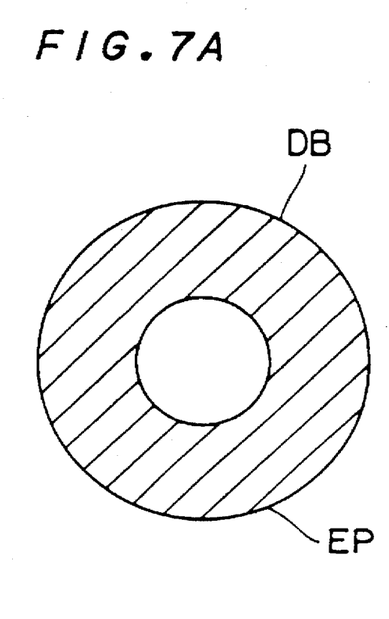
FIGS. 7A and 7B are views for describing an influence of inclination of a sample over reflected light.
Figure 7B:
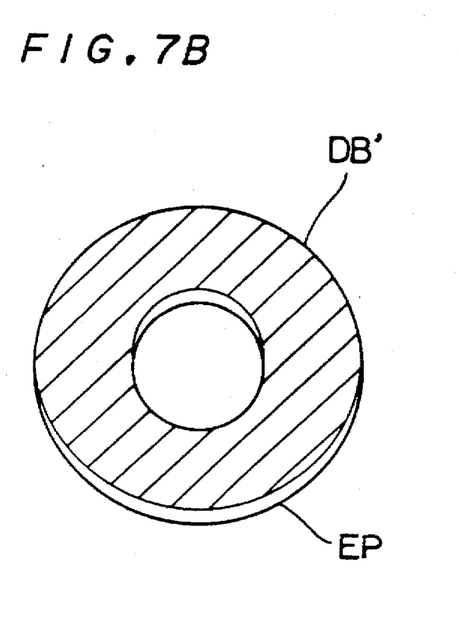

FIGS. 7A and 7B are views for describing an influence of inclination of the surface of the sample SP over the reflected light. When the sample SP is not inclined and is correctly focused, the bundle of the reflected light impinging upon the pin hole PH of the plate PP from a pupil EP of the reflection objective lens RO passes through the entire area DB shown with hatching lines of the pupil EP (FIG. 7A). On the other hand, when the sample SP is inclined, the bundle of the reflected light impining upon the pin hole PH passes through a local area DB' shown with hatching lines of the pupil EP (FIG. 7B), whereby a so-called eclipse is created.

When there is inclination, that is, an eclipse as shown in FIG. 7B, if the luminance distribution obtained by the illumination system has a wavelength dependence, the spectral reflectance decreases at different rates with different wavelengths, rather than uniformly decreases against every wavelength. Further, the spectral reflectance decreases differently depending on the direction in which the sample SP is inclined.

Figure 8A:
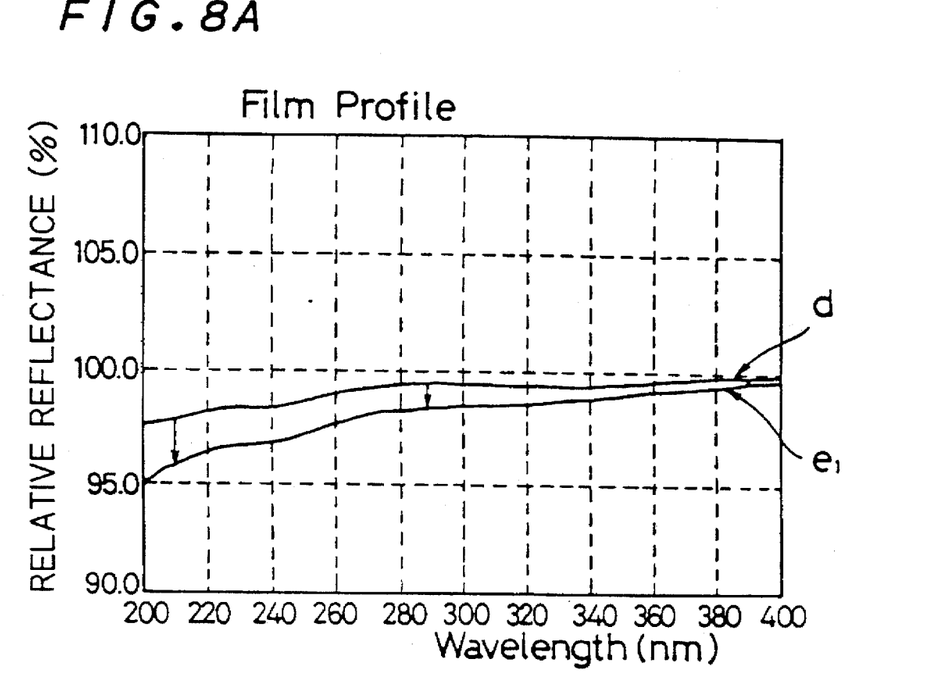
FIGS. 8A and 8B are views for describing an influence of inclination of a sample over a spectral characteristic.
Figure 8B:
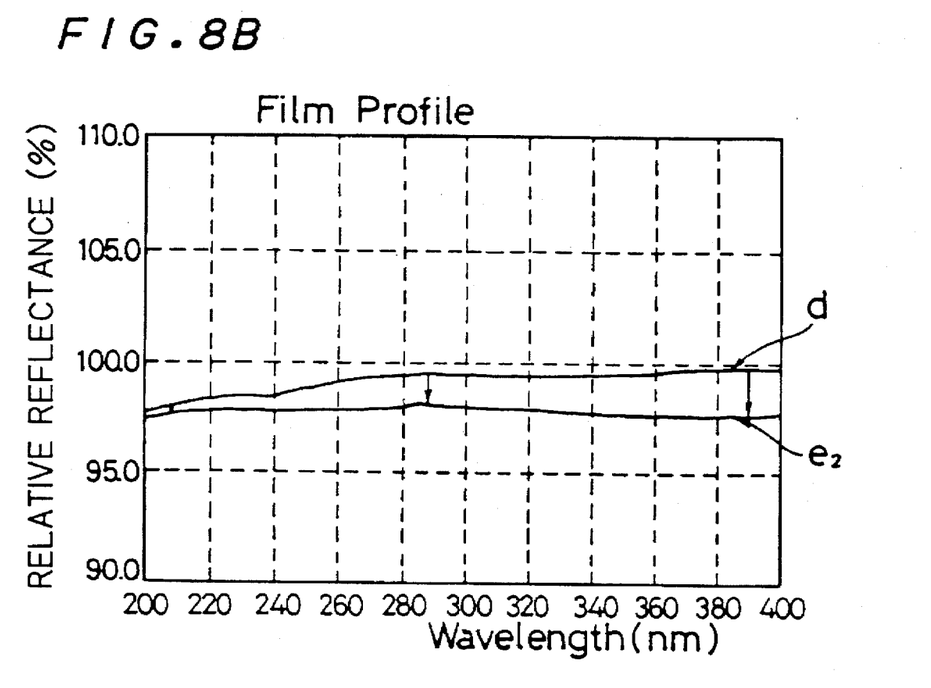

FIGS. 8A and 8B are views for describing that the spectral reflectance decreases differently due to the inclination of the surface of the sample SP. FIG. 8A shows a case where the surface of the sample SP is inclined at a predetermined angle in a certain direction, while FIG. 8B shows a case where the surface of the sample SP is inclined at the predetermined angle in a different certain direction. In the both graphs, the curves d each express a relative spectral reflectance when there is no inclination, and the curves e1 and e2 express relative spectral reflectances when there is inclination. In FIGS. 8A and 8B, as is clearly understood from comparison of the curves d with the curves e1 and e2, the rate of a decrease in the spectral reflectance is different at different wavelengths.

Hence, if the surface of the sample SP is inclined, although the actual spectral reflectance is compared with the calibrated spectral reflectance on the same sample, a result of the comparison differs depending on the condition of the inclination. This makes it impossible to measure the film thickness of the sample SP with an excellent reproducibility.

SUMMARY OF THE INVENTION

The present invention is directed to a film thickness measuring apparatus which is formed by an illumination system which has a light source and illuminates a sample in which a thin film is formed on a substrate, an imaging system which converges reflected light which is reflected by the sample, a spectroscopic system which obtains spectral signals of the reflected light through the imaging system, calculation means which calculates actual spectral reflectances of third film from spectral signals and determines the film thickness of the thin film by means of comparison of the actual spectral reflectances with calibrated spectral reflectances calibrated reflectances being theoretically calculated from optical data of the thin film, and secondary light source forming means which corrects a wavelength dependence of luminance distribution on the light source.

According to the present invention, the calculation means determines the film thickness of the thin film after converting at least one of the actual spectral reflectances and the calibrated spectral reflectances in such a mariner that an average value of the actual spectral reflectances is equal to an average value of the calibrated spectral reflectances.

Since the secondary light source forming means corrects the wavelength dependence of the luminance distribution on the light source, even when an eclipse is created in reflected light due to inclination of the sample or defocusing of the imaging system or other reasons and the energy of the reflected light is decreased accordingly, a spectral distribution of the reflected light entering the spectroscopic system is maintained with almost no change. Hence, if the calculation means performs data conversion on at least one group of the actual spectral reflectances and the calibrated spectral reflectances in such a manner that the average value of the actual spectral reflectances is equal to the average value of the calibrated spectral reflectances, it is possible to compare the actual spectral reflectances with the calibrated spectral reflectances while offsetting an influence of inclination of the sample. This makes it possible to accurately measure the film thickness regardless of inclination of the sample or other factors.

According to a second aspect of the present invention, in the film thickness measuring apparatus of the first aspect of the present invention, the calculation means converts one of the actual spectral reflectances and the calibrated spectral reflectances according to a ratio of the average value of the actual spectral reflectances to the average value of the calibrated spectral reflectances.

Since the calculation means performs data conversion on at least one of the actual spectral reflectances and the calibrated spectral reflectances according to the ratio of the average value of the actual spectral reflectances to the average value of the calibrated spectral reflectances, it is possible to compare the actual spectral reflectances with the calibrated spectral reflectances while more accurately offsetting an influence of inclination of the sample. In other words, when the energy of the reflected light impinging upon the spectroscopic system is decreased due to inclination of the sample or defocusing of the imaging system or other reasons, according to principles, a spectral distribution of the reflected light which is detected by the spectroscopic system must be obtained by multiplying a spectral distribution of when the sample is not inclined and there is accordingly no defocusing by an appropriate coefficient. Hence, by multiplying the actual spectral reflectances by the ratio of the average of the actual spectral reflectances to the average of the calibrated spectral reflectances, for example, it is possible to calculate the actual spectral reflectances as it is in an ideal condition without any inclination of the sample. Thus, the influence of inclination of the sample is more accurately offset.

A third aspect of the present invention is directed to a method of measuring the thickness of a thin film of a sample in which the thin film is formed on a substrate. According to the present invention, the method comprises the steps of: (a) illuminating the sample through secondary light source forming means for correcting wavelength dependence of luminance distribution on a light source; (b) converging light reflected from the sample and then obtaining spectral signals of the reflected light; (c) calculating actual spectral reflectances of said thin film from the spectral signals; (d) converting at least one of the actual spectroscopic reflectances and calibrated spectroscopic reflectances calculated theoretically from optical data of the thin film in such a manner that an average value of the actual spectroscopic reflectances is equal to an average value of the calibrated spectroscopic reflectances; and (e) comparing the actual spectroscopic reflectances with the calibrated spectroscopic reflectances to determine the thickness of the thin film.

Since the secondary light source forming means corrects the wavelength dependence of the luminance distribution on the light source, even when an eclipse is created in reflected light due to inclination of the sample or other reasons and the energy of the reflected light is decreased accordingly, a spectral distribution of the reflected light is maintained with almost no change. Hence, if data conversion on at least one of the actual spectral reflectances and the calibrated spectral reflectances is performed in such a manner that the average value of the actual spectral reflectances is equal to the average value of the calibrated spectral reflectances, it is possible to compare the actual spectral reflectances with the calibrated spectral reflectances while offsetting an influence of inclination of the sample. This makes it possible to accurately measure the film thickness regardless of inclination of the sample or other factors.

Accordingly, an object of the present invention is to provide an apparatus and a method for measuring the thickness of a thin film which is formed on a substrate with an excellent reproducibility regardless of inclination of a surface of the sample.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
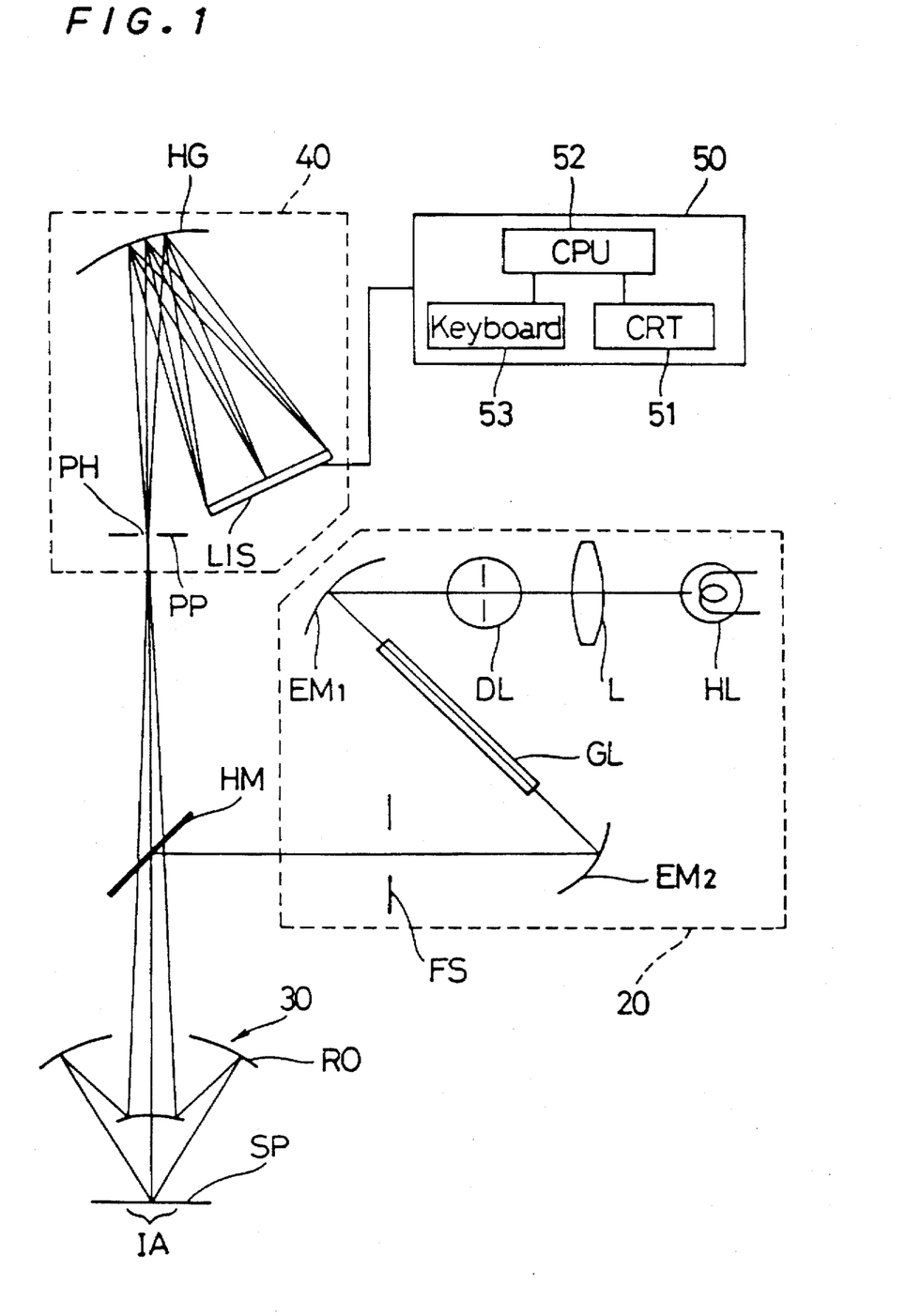
FIG. 1 is a diagram showing a structure of a film thickness measuring apparatus according to the present invention.

FIG. 1 is a diagram showing a structure of a film thickness measuring apparatus according to a preferred embodiment of the present invention.

The film thickness measuring apparatus comprises an illumination system 20 for generating illuminated light which illuminates a sample SP, an imaging system 30 for irradiating the illuminated light from the illumination system 20 upon the sample SP and for converging reflected light which is reflected by the sample SP, a spectroscopic unit 40 for separating the reflected light which is converged by the imaging system 30, and a control unit 50 for calculating the film thickness of a transparent thin film which is formed on a surface of the sample SP based on a spectral detection output from the spectroscopic unit 40.

The illumination system 20 includes a halogen lamp HL and a see-through type deuterium lamp DL as a light source, to emit light which covers a certain observation wavelength range (200 nm to 800 nm, for example). A bundle of light emitted from the halogen lamp HL is converged at a light emitting part of the deuterium lamp DL through a lens L and thereafter at an incident end of a cylindrical glass rod GL which serves as secondary light source forming means through a first off-axis ellipse mirror $EM_1$. The bundle of light passing through the glass rod GL then impinges upon a field stop FS through a second off-axis ellipse mirror $EM_2$. A filament of the halogen lamp HL, the light emitting part of the deuterium lamp DL, and the incident end of the cylindrical glass rod GL are conjugate with each other.

The glass rod GL is a synthesized quartz glass rod. The glass rod GL therefore has a uniform luminance distribution at an outgoing end even if a luminance distribution is not uniform at an incident end. Due to this nature, a luminance distribution has almost no wavelength dependence at the outgoing end of the glass rod GL. That is, using this glass rod GL so that the outgoing end of the glass rod GL serves as a secondary light source, it is possible to reduce the inherent wavelength dependence of the luminance distribution of the light source to as low as an ignorable level. As a result, the luminance distribution of the illuminated light passing through the field stop FS has no wavelength dependence.

Now, a brief description will be given on a reason why the wavelength dependence of the luminance distribution of the light source is corrected by the glass rod GL. Of light source light entering the glass rod GL at the incident end, light impinging parallel to an optical axis of the glass rod GL propagates straight and arrives at the outgoing end, light impinging at a medium incident angle arrives at the outgoing end after reflected a certain times, and light impinging at an incident angle as large as a critical angle arrives at the outgoing end after reflected a maximum number of times. Since rays reflected various number of times are mixed with each other and arrive at the outgoing end as the uniform light source light, the wavelength dependencies of the luminance distributions of the halogen lamp HL and the deuterium lamp DL are corrected.

The imaging system 30 is formed by a reflection objective leas RO for imaging and a half mirror HM for epi-illumination. The illuminated light from the illumination system 20 is reflected by the half mirror HM, and is irradiated upon a predetermined illumination area IA at which the sample SP is located, through the reflection objective lens RO. The reflection objective lens RO is used for imaging since the reflection objective lens RO creates no chromatism and a sufficient transmittance ratio is obtained even from ultraviolet light. A pupil of the reflection objective lens RO is conjugate with the light emitting part of the deuterium lamp DL, thereby realizing Koehler illumination. Further, the illumination area IA at which the sample SP is located is conjugate with an aperture of the field stop FS so that the field stop FS determines the illumination area IA.

Although not shown in FIG. 1, an XY stage is disposed below the sample SP. The XY stage is moved in an X-direction and a Y-direction as it mounts the sample SP, in order to position an optional region of a surface of the sample SP at the illumination area IA. In addition, the XY stage includes a mechanism for detecting the position of the XY stage (i.e., X-, Y-coordinates) and supplying the resulting positional information to the control unit 50.

The light which is reflected by the sample SP which is located at the illumination area IA is converged at a predetermined position on the optical axis through the reflection objective lens RO for imaging and the half mirror HM. The plate PP having the pin hole PH at the center is disposed at the conversion position. Therefore, of the reflected light from the sample SP, only light which passed through the pin hole PH is selectively incident upon the spectroscopic unit 40.

The spectroscopic unit 40 is formed by the pin hole PH described above, a concave diffraction grating HG for separating reflected light, and a photo detector LIS for detecting spectrum of diffracted light which is diffracted by the concave diffraction grating HG as an electric signal. The photo detector LIS is a linear image sensor which is formed by a photo diode array, CCD and the like, and is located so as to be conjugate with the pin hole PH. Hence, the light entering the spectroscopic unit 40 is separated by the concave diffraction grating HG and incident upon the photo detector LIS, whereby a spectral signal corresponding to the energy of each spectrum is supplied to the control unit 50 from the photo detector LIS.

The control unit 50 includes a CPU 52 having a known structure for performing a logical operation, so as to transfer a signal between a CRT 51 and a key board 53 through an input/output port not shown. The CPU 52 calculates the film thickness of a thin film which is formed on the sample SP by a method which will be described later, based on the spectral signal received from the photo detector LIS, and outputs a result of the calculation to the CRT 51.

Figure 2:
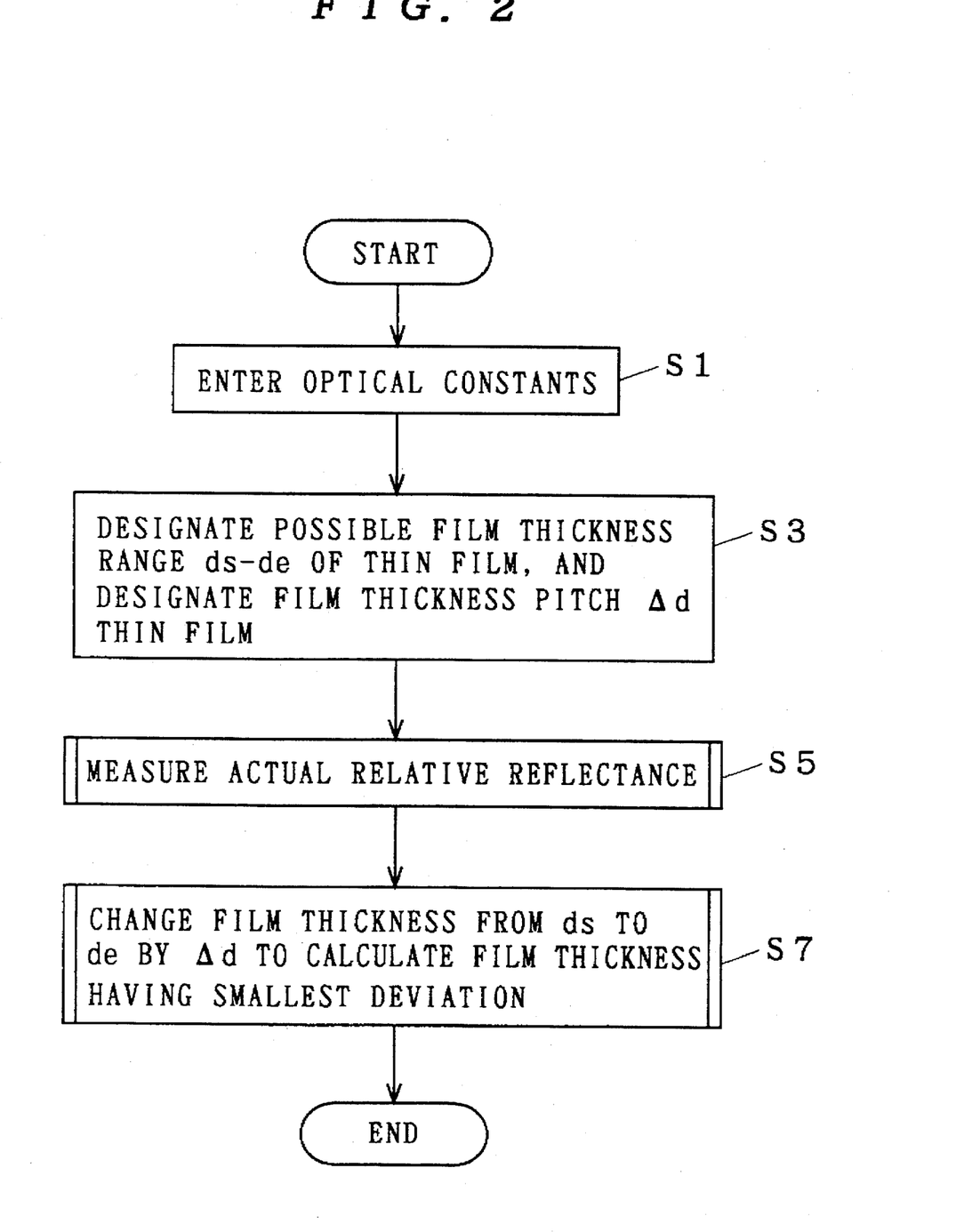
FIG. 2 is a flow chart showing an operation of the film thickness measuring apparatus shown in FIG. 1.

Now, an operation of the film thickness measuring apparatus shown in FIG. 1 will be described with reference to FIGS. 2, 3 and 4. This preferred embodiment is related to a case where the film thickness d of the sample SP which is formed by a substrate and an overlying thin monolayer film is measured. In addition, with respect to this preferred embodiment, each spectral reflectance is defined as "a rate of an object spectral signal which is taken on a sample relative to a reference spectral signal which is taken on a reference sample which seats no thin film," a spectral reflectance of the sample SP which is calculated based on an actual measurement will be referred to as "an actual relative reflectance," and a spectral reflectance of the sample SP which is calculated theoretically will be referred to as "a calibrated relative reflectance."

(1) First, at Step S1, through the key board 53 of the control unit 50, an operator enters optical constants such as a refractive index n ($\lambda$) of the thin film on the sample SP at each wavelength and an absorption coefficient k ($\lambda$). The input data are stored in a memory of the control unit 50 (not shown) and read if necessary during calculation which will be described later.

(2) Next, at Step S3, a possible range ds-de of the film thickness of the thin film on the sample SP is designated. The designated film thickness range ds-de is necessary to limit calculation of a calibrated relative reflectance to a certain range. Further, at Step S3, a film thickness pitch $\Delta d$ for calculating the calibrated relative reflectance is also designated. The film thickness pitch $\Delta d$ is necessary to calculate the calibrated relative reflectance while gradually changing a theoretically possible virtual film thickness. As described later in detail, the calibrated relative reflectance which is calculated in this manner is sequentially compared with an actual relative reflectance and used to calculate an optimal film thickness.

(3) Next, at Step S5, in an observation wavelength range (200 nm to 400 nm, for example), as a ratio of a spectral signal of the sample SP to a spectral signal of a reference calibration sample (i.e., the Si substrate alone), an actual relative reflectance Rmeas($\lambda$) is actually measured. More specifically, calculation is performed following steps as those shown in FIG. 3.

First, at Step S101, the halogen lamp HL and the deuterium lamp DL are turned on. At Step S102, an operator sets a calibration sample on the XY stage, so that light reflected by the calibration sample is converged at the predetermined position on the optical axis through the reflection objective lens RO and the half mirror HM, light passing through the pin hole PH of the plate PP impinges upon the spectroscopic unit 40, and the light is separated in the wavelength range from 200 nm to 400 nm (Step S103). At Step S104, light entering the photo detector LIS is photoelectrically converted. Each spectral signal is supplied to the control unit 50, and is thereafter stored in the memory of the control unit 50 as spectral data C($\lambda$).

Following this, the operator removes the calibration sample from the XY stage, and mounts the sample SP to be measured on the XY stage (Step S105). As a result, light reflected by the sample SP impinges upon the spectroscopic unit 40 in a similar manner. The light is separated in the wavelength range from 200 nm to 400 nm (Step S106), and is stored in the memory of the control unit 50 as spectral data M($\lambda$) (Step S107).

Repeating Step S108 to Step S110, in the wavelength range from 200 nm to 400 nm, the spectral data C($\lambda$) and the spectral data M($\lambda$) are read from the memory at an appropriate pitch, e.g., 1 nm pitch, and in accordance with the following relationship:

$$Rmeas(\lambda) = \frac{M(\lambda)}{C(\lambda)} \times 100(\%) \qquad \text{Eq. 1}$$

the actual relative reflectance Rmeas($\lambda$) of the sample SP is calculated. Data related to the actual relative reflectance Rmeas($\lambda$) (hereinafter referred to as "actual spectral relative reflectance data") are then Stored in the memory (Step S109).

The relative reflectance of the sample SP is calculated in the wavelength range from 200 nm to 400 nm in this manner. An interference waveform is obtained by plotting the actual relative reflectance Rmeas($\lambda$) against each wavelength $\lambda$.

(4) Next, referring back to FIG. 2, at Step S7, while changing the film thickness d of the thin film by the film thickness pitch $\Delta$d in the designated film thickness range ranging from the minimum value ds to the maximum value de, a deviation (i.e., an error value) between the calibrated relative reflectance and the actual relative reflectance at each film thickness d (=ds+m * $\Delta$d; m is a positive integer) is calculated, to thereby find the film thickness d which has the smallest deviation. More specifically, calculation is performed following steps as those shown in FIG. 4.

First, at Step S202, the actual spectral relative reflectance data are read from the memory of the control unit 50 and $\overline{Rmeas}$ is calculated as an average value of the actual relative reflectance Rmeas($\lambda$) with respect to the wavelength. Next, at Step S203, a film thickness ds is set as the film thickness d with which calculation of a calibrated relative reflectance Rstd($\lambda$) is started.

At Step S204, the calibrated relative reflectance Rstd($\lambda$) corresponding to the film thickness ds is calculated at a wavelength pitch of 1 nm, for instance. The calibrated relative reflectance Rstd($\lambda$) can be calculated by a conventional formula, if optical constants, e.g., as an optional wavelength $\lambda$ within the wavelength range from 200 nm to 400 nm for calculation and a refractive index of the thin film which forms the sample SP against each wavelength, and the film thickness d of the thin film are known. At Step S205, $\overline{Rstd}(d)$ is calculated as an average value of the calibrated relative reflectance Rstd($\lambda$) with respect to the wavelength. At Step S206, in accordance with the following equation:

$$\Delta I = \overline{Rstd}(d) / \overline{Rmeas} \qquad \text{Eq. 2}$$

a reflectance change ratio $\Delta I$ is calculated. As is clear from the equation Eq. 2 above, the reflectance change ratio $\Delta I$ is a ratio of $\overline{Rstd}(d)$, i.e., the average value of the calibrated relative reflectance Rstd($\lambda$), to $\overline{Rmeas}$, i.e., the average value of the actual relative reflectance Rmeas($\lambda$). Next, at Step S207, the actual relative reflectance Rmeas($\lambda$) is corrected at each wavelength and set as a new actual relative reflectance Rmeas($\lambda$). The corrected actual relative reflectance Rmeas ($\lambda$) is obtained by multiplying the original actual relative reflectance Rmeas($\lambda$), which is calculated by the method shown in FIG. 3, by the reflectance change ratio $\Delta I$. At Step S208, in accordance with the following equation:

$$E = \sum_{\lambda=\lambda s}^{\lambda e} (Rstd(\lambda) - Rmeas(\lambda))^2 \qquad \text{Eq. 3}$$

an error value E, i.e., a substantial deviation between the calibrated relative reflectance Rstd($\lambda$) and the actual relative reflectance Rmeas($\lambda$) is calculated. In the equation Eq. 3, $\lambda s$ is 200 nm and $\lambda e$ is 400 nm.

The calculation as above at Step S204 to Step S208 is performed on the film thickness d which gradually increases, to calculate the error value E(d) for each film thickness d up to the maximum film thickness de (Step S209). At last, at Step S210, the minimum value Emin is calculated from the error value E(d) within the designated film thickness range ds-de, and the resulting value d is determined as the film thickness.

Figure 3:
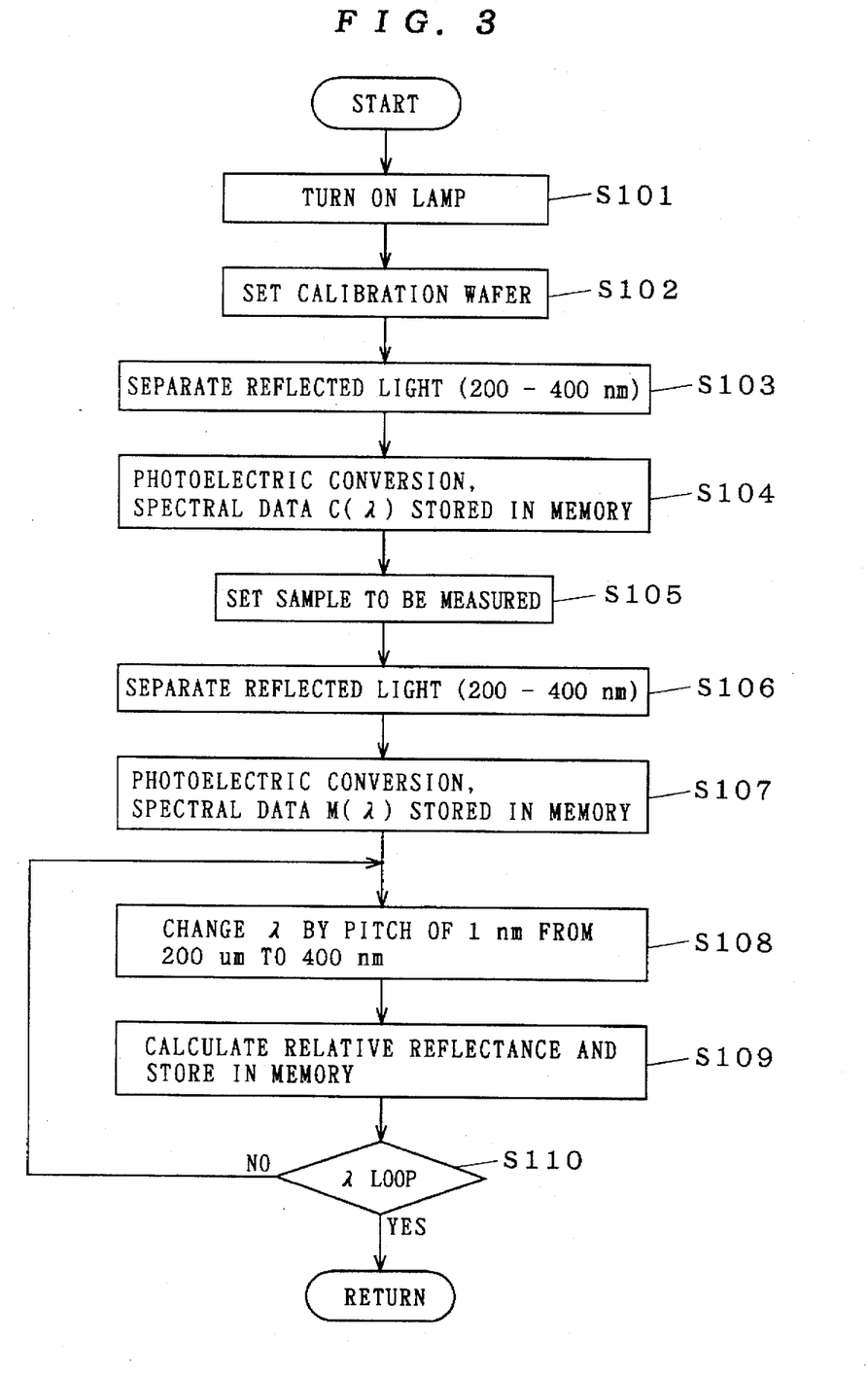
FIG. 3 is a flow chart showing steps for measuring an actual relative reflectance of a sample.
Figure 4:
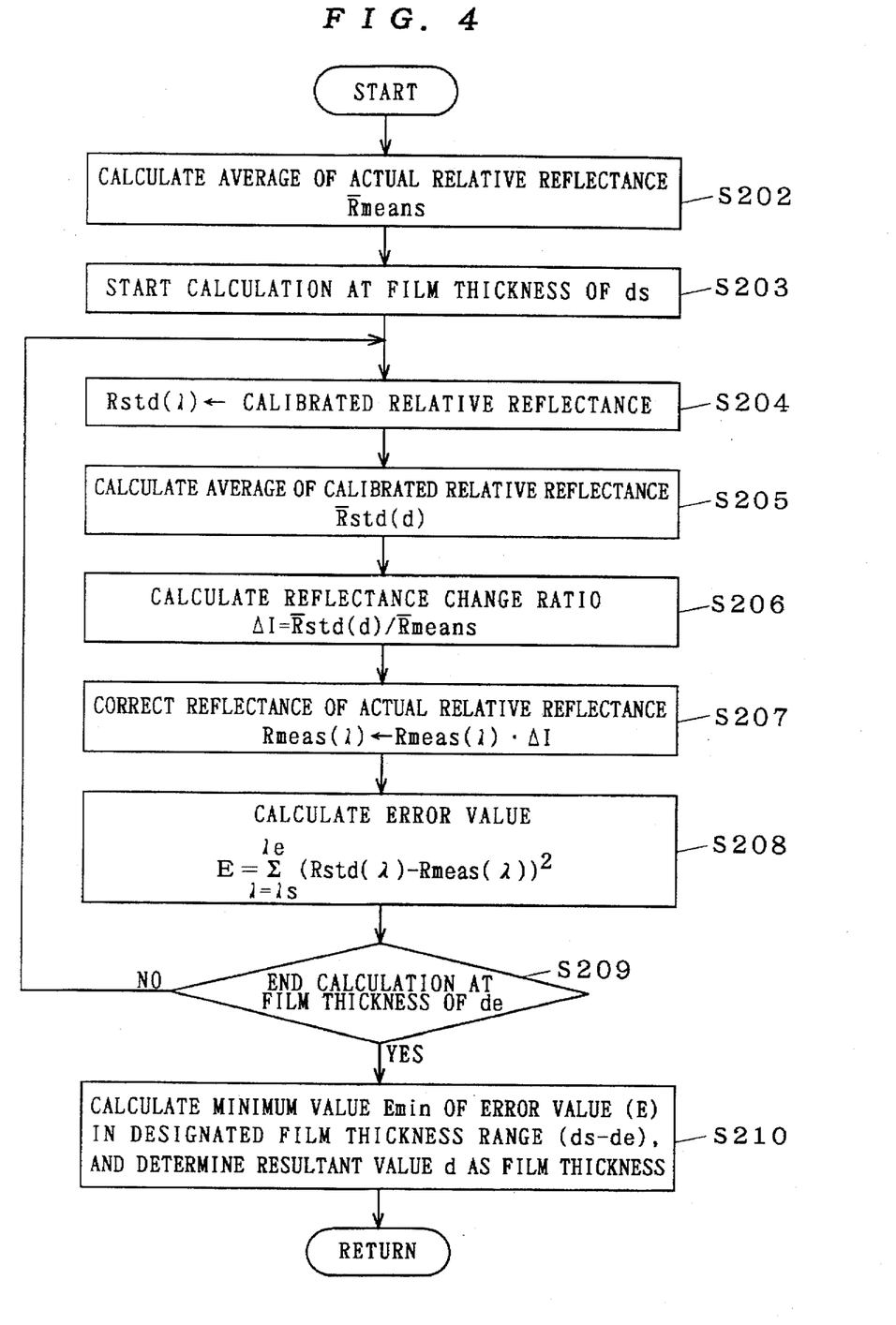
FIG. 4 is a flow chart showing steps for calculating a film thickness having the smallest deviation.
Figure 5A:
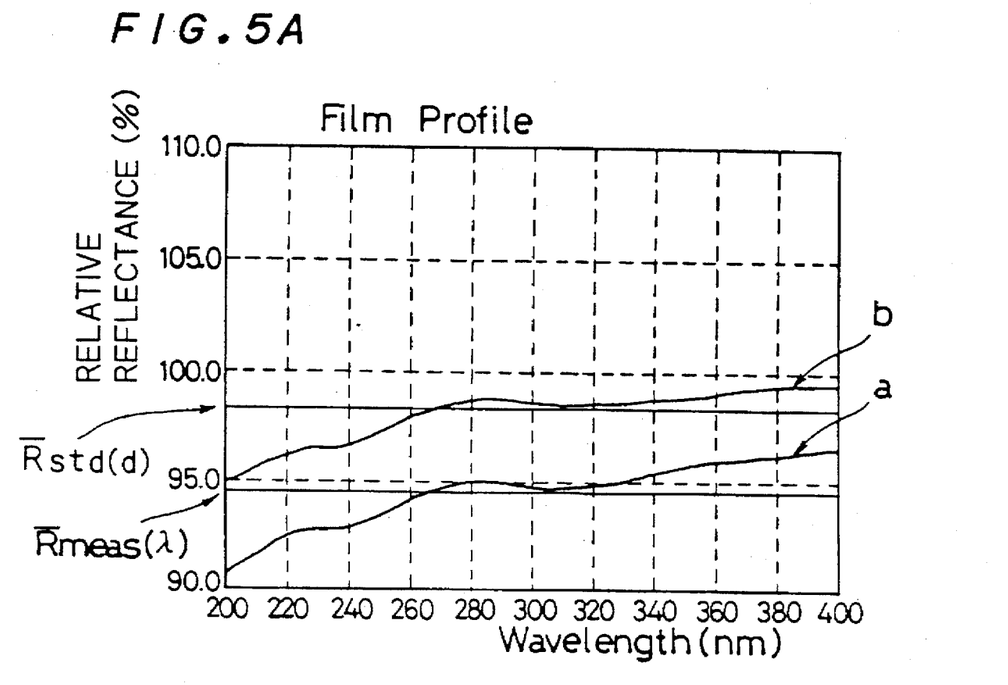
FIGS. 5A and 5B are graphs for describing the steps shown in FIGS. 3 and 4.
Figure 5B:
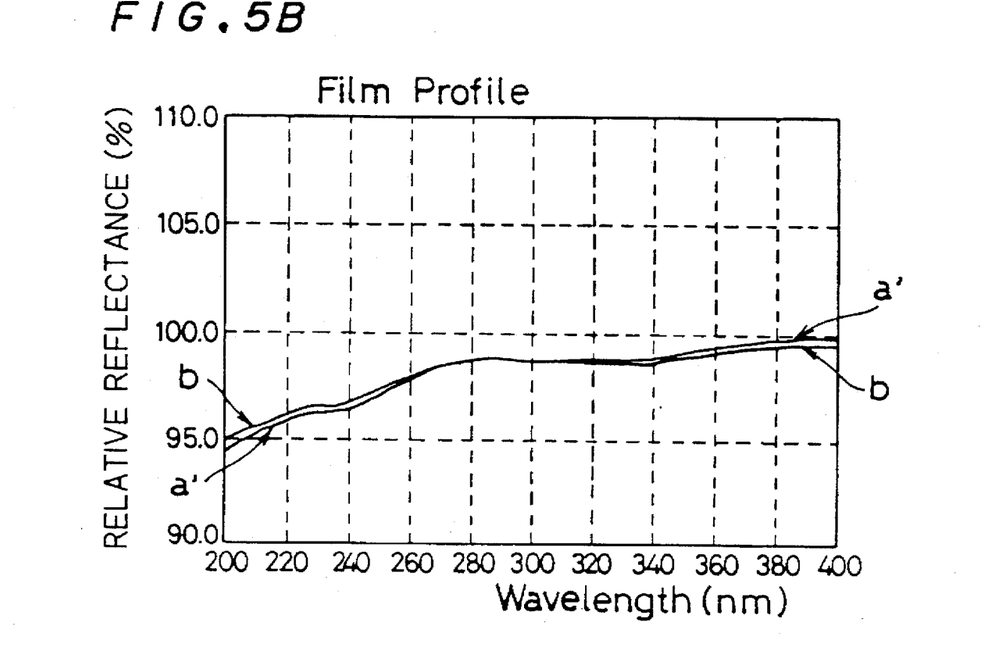

FIGS. 5A and 5B are graphs for describing the steps shown in FIGS. 3 and 4.

In FIG. 5A, the horizontal axis expresses the wavelengths and the vertical axis expresses the relative reflectances. In the graphs, the curve a denotes a profile of the actual relative reflectance Rmeas($\lambda$) which is calculated by the method shown in FIG. 3, while the curve b denotes a profile of the calibrated relative reflectance Rstd($\lambda$) which is calculated at Step S204 shown in FIG. 4. $\overline{Rmeas}$ which is the average value of the curve a is what is calculated at Step S202 shown in FIG. 4, while $\overline{Rstd}(d)$ which is the average value of the curve b is what is calculated at Step S205 shown in FIG. 4.

In FIG. 5B, the curve a' denotes a profile of the corrected actual relative reflectance Rmeas($\lambda$) which is calculated at Step S207 shown in FIG. 4. The curve b is the same as the curve b in FIG. 5A in that it denotes a profile of the calibrated relative reflectance Rstd($\lambda$). As clearly shown in FIG. 5B, the average values of the curves a' and b are equal to each other. From the pair of the curves a' and b, the error value E(d), i.e., a deviation between the averages, is calculated (See Step S208 in FIG. 4).

As described above, in the apparatus according to the embodiment, since the illumination system 20 includes the glass rod GL which corrects the wavelength dependencies of the luminance distributions of the halogen lamp HL and the deuterium lamp DL which serve as a light source, even when the sample SP is inclined to consequently defocus the imaging system 30 and create an eclipse in an image of the reflected light which is formed at the plate PP by the reflection objective lens RO, the spectral distribution (i.e., distribution profile) of the reflected light which impinges upon the spectroscopic unit 40 is maintained with almost no change.

That is, in accordance with principles, when the intensity of the reflected light which impinges upon the spectroscopic unit 40 is decreased due to inclination of the sample SP or other reasons, the spectral distribution of the reflected light which is detected by the spectroscopic unit 40 has a similar configuration which is defined by multiplying the spectral distribution of when the sample SP is not inclined and there is accordingly no defocusing by an appropriate coefficient. Hence, as shown at Step S207 in the flow chart in FIG. 4, by multiplying the actual relative reflectance Rmeas($\lambda$) by the reflectance change ratio $\Delta I$ (which is a ratio of $\overline{R}std(d)$, i.e., the average value of the calibrated relative reflectance, to $\overline{R}meas$, i.e., the average value of the actual relative reflectance), it is possible to obtain the actual relative reflectance Rmeas($\lambda$) as it is in an ideal condition without any inclination of the sample SP.

Using the actual relative reflectance Rmeas($\lambda$) as it is after correction of the reflectance, it is possible to compare the actual relative reflectance Rmeas($\lambda$) with the calibrated relative reflectance Rstd($\lambda$) while offsetting an influence of inclination of the sample SP or the like. Hence, by calculating the film thickness d which has the smallest error value E, i.e., the deviation, as shown at Step S208 in the flow chart in FIG. 4, it is possible to accurately measure the film thickness regardless of inclination of the sample SP, etc.

Figure 6:
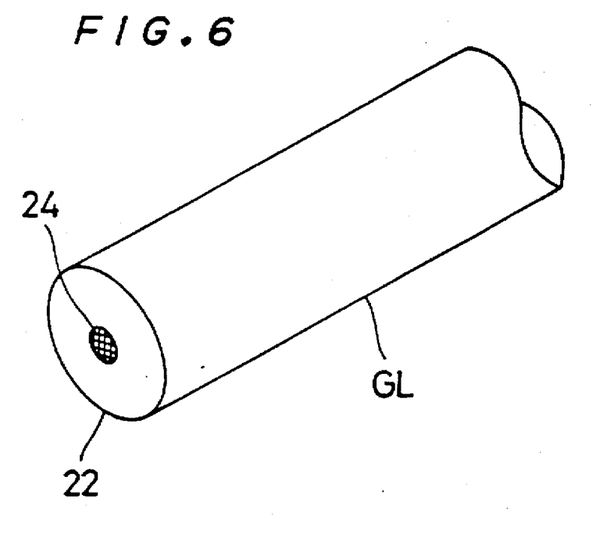
FIG. 6 is a view for describing modified secondary light source forming means.

While the present invention has been described in relation to the preferred embodiment above, the present invention is not limited to the preferred embodiment above. For example, a light shield may be disposed at the outgoing end of the glass rod GL which forms the illumination system 20 shown in FIG. 1. FIG. 6 is a view enlarging the outgoing end 22 of the glass rod GL. At the outgoing end 22, illuminated light having a corrected wavelength dependence of the luminance distribution is emitted. However, as there is an unclear area at the center of the reflection objective lens RO, it is possible that flare and stray light are created by a ray which is incident upon this area. To deal with this, a circular light shield 24 may be disposed at the outgoing end 22 of the glass rod GL so as to be concentric with the glass rod GL, as shown in FIG. 6. The light shield 24 is positioned to correspond the unclear area of the reflection objective lens RO, thereby reducing an unwanted ray entering the reflection objective lens RO and preventing flare and the like.

In addition, although the preferred embodiment above requires to form the illumination system 20 with the glass rod GL used as the secondary light source, the glass rod GL may be replaced with a prism-like shaped kaleidoscope to thereby form a kaleidoscope illumination system. In this manner as well, the wavelength dependence of the luminance distribution of the light source can be corrected. Further, an integrating sphere may be used instead of the glass rod GL. In this case, a ray from the halogen lamp HL or the like impinges upon an incident opening of the integrating sphere and illuminated light is emitted from a detection opening of the integrating sphere, whereby the illuminated light has a corrected wavelength dependence of the luminance distribution as in the structure described above. Further, an optical fiber may be used instead of the glass rod GL, in which case as well the wavelength dependence of the luminance distribution of the light source is corrected. Still further, a hollow structure having mirror inner surfaces may be used instead of the glass rod GL, in which case as well the wavelength dependence of the luminance distribution of the light source is corrected.

In the preferred embodiment above, the actual relative reflectance Rmeas($\lambda$) is multiplied by the reflectance change ratio $\Delta I$, i.e., a ratio of $\overline{R}std(d)$ which is the average value of the calibrated relative reflectance to $\overline{R}meas$ which is the average value of the actual relative reflectance to correct the reflectance (See Step S207 in FIG. 4). Rather, the calibrated relative reflectance Rstd($\lambda$) may be multiplied by an inverse number $1/\Delta I$ of the reflectance change ratio to correct the reflectance on the calibrated relative reflectance Rstd($\lambda$) side, and a deviation between the new calibrated relative reflectance Rstd($\lambda$) and the actual relative reflectance Rmeas($\lambda$) may be then calculated. A result of film thickness measurement is almost the same as that obtained in the structure described above.

Further, while the actual relative reflectance Rmeas($\lambda$) is multiplied by the reflectance change ratio $\Delta I$ to correct the reflectance in the preferred embodiment above (See Step S207 in FIG. 4), the reflectance may be corrected using a reflectance difference instead of using the reflectance change ratio. In this case, a reflectance difference $\delta I$, i.e., a difference between $\overline{R}meas$ which is the average value of the actual relative reflectance and $\overline{R}std(d)$ which is the average value of the calibrated relative reflectance is calculated by the following formula:

$$\delta I = \overline{R}std(d) - \overline{R}meas \qquad \text{Eq. 4}$$

The resultant reflectance difference $\delta I$ is added to the actual relative reflectance Rmeas($\lambda$), i.e., shifting is performed, to correct the reflectance. Following this, a deviation between the calibrated relative reflectance Rstd($\lambda$) and the new actual relative reflectance Rmeas($\lambda$) is calculated. A result of film thickness measurement is almost the same as that obtained in the structure described above.

Still further, although the sample SP to be measured is formed by a substrate and an overlying monolayer thin film in the preferred embodiment above, the sample SP to be measured may be formed by a substrate and more than one overlying thin films. In this case, only if the refractive index, the absorbance coefficient and the like of each thin film are known in advance, by changing the set film thickness of each thin film within a predetermined film thickness range by an appropriate film thickness pitch $\Delta d$ and calculating a calibrated relative reflectance and hence a deviation with respect to each film thickness, it is possible to calculate an optimal film thickness d based on the smallest reflectance and the smallest deviation.

While the invention has been described in detail, the foregoing description is in all aspects illustrative and not restrictive. It is understood that numerous other modifications and variations can be devised without departing from the scope of the invention.

We claim:

1. A film thickness measuring apparatus, comprising
   an illumination system having a light source for illuminating a sample in which a thin film is formed on a substrate,
   an imaging system for converging reflected light which is reflected by said sample,
   a spectroscopic system for obtaining spectral signals of said reflected light through said imaging system,
   calculation means for calculating actual spectral reflectances of said thin film from said spectral signals, and for determining the film thickness of said thin film by means of comparison of said actual spectral reflectances with calibrated spectral reflectances, said calibrated reflectances being theoretically calculated from optical data of said thin film, and
   secondary light source forming means for correcting wavelength dependence of luminance distribution on said light source, wherein
   said calculation means determines the film thickness of said thin film after converting at least one of said actual spectral reflectances and said calibrated spectral reflectances in such a manner that an average value of said actual spectral reflectances is equal to an average value of said calibrated spectral reflectances.

2. The film thickness measuring apparatus of claim 1, wherein said secondary light source forming means comprises a glass rod.

3. The film thickness measuring apparatus of claim 2, wherein said imaging system comprises a reflection objective lens, and said secondary light source forming means has an exit surface which is disposed at a conjugate position with a pupil of said imaging system.

4. The film thickness measuring apparatus of claim 3, wherein said calculation means converts one of said actual spectral reflectances and said calibrated spectral reflectances according to a ratio of the average value of said actual spectral reflectances to the average value of said calibrated spectral reflectances.

5. The film thickness measuring apparatus of claim 3, wherein said calculation means converts one of said actual spectral reflectances and said calibrated spectral reflectances according to a difference between the average value of said actual spectral reflectances and the average value of said calibrated spectral reflectances.

6. The film thickness measuring apparatus of claim 3, wherein said calculation means calculates an actual relative reflectance which is defined as a rate of an object spectral signal which is taken on said sample relative to a reference spectral signal which is taken on a reference sample in which a thin film is not formed, as said actual spectral reflectance, and calculates a calibrated relative reflectance which is defined as a rate of a theoretical object spectral signal which is obtained on said reference sample with a virtual film relative to a theoretical reference spectral signal which is taken on said reference sample, as said calibrated spectral reflectance.

7. The film thickness measuring apparatus of claim 6, wherein said calculation means calculates said calibrated relative reflectance with respect to each thickness while changing the thickness of said virtual film at predetermined intervals, to thereby define the thickness of said thin film as the thickness which corresponds to said calibrated relative reflectance which has the smallest deviation from said actual spectral reflectance.

8. A method of measuring the thickness of a thin film of a sample in which the thin film is formed on a substrate, said method comprising the steps of:

(a) illuminating said sample through secondary light source forming means for correcting wavelength dependence of luminance distribution on a light source;

(b) converging light reflected from said sample and then obtaining spectral signals of said reflected light;

(c) calculating actual spectral reflectances of said thin film from said spectral signals;

(d) converting at least one of said actual spectral reflectances and calibrated spectral reflectances calculated theoretically from optical data of said thin film in such a manner that an average value of said actual spectral reflectances is equal to an average value of said calibrated spectral reflectances; and (e) comparing said actual spectral reflectances with said calibrated spectral reflectances to determine the thickness of said thin film.

9. The method of claim 8, said step (d) comprising the step of:

obtaining a ratio of said average value of said actual spectral reflectances to said average value of said calibrated spectral reflectances; and converting one of said actual spectral reflectances and said calibrated spectral reflectance according to said ratio.

10. The method of claim 8, said step (d) comprising the steps of:

obtaining a difference between said average value of said actual spectral reflectances and said average value of said calibrated spectral reflectances; and converting one of said actual spectral reflectances and said calibrated spectral reflectances according to said difference.

* * * * *